Oct. 30, 1962  H. A. ADAMS  3,061,162
METHOD AND MEANS FOR DISPENSING TRADING STAMPS
Filed April 16, 1958  3 Sheets-Sheet 1

INVENTOR,
HAROLD A. ADAMS.
WHANN & McMANIGAL
Attorneys for Applicant
by

Oct. 30, 1962 H. A. ADAMS 3,061,162
METHOD AND MEANS FOR DISPENSING TRADING STAMPS
Filed April 16, 1958 3 Sheets-Sheet 2

INVENTOR,
HAROLD A. ADAMS.
WHANN & McMANIGAL
Attorney for Applicant

Oct. 30, 1962 H. A. ADAMS 3,061,162

METHOD AND MEANS FOR DISPENSING TRADING STAMPS

Filed April 16, 1958 3 Sheets-Sheet 3

INVENTOR,
HAROLD A. ADAMS.
WHANN & McMANIGAL.
Attorneys for Applicant

United States Patent Office 3,061,162
Patented Oct. 30, 1962

3,061,162
METHOD AND MEANS FOR DISPENSING
TRADING STAMPS
Harold A. Adams, Isabella, Calif., assignor of four-twelfths to Clement Smith, four-twelfths to Max Stubbs, two-twelfths to Jack Parlier, one-twelfth to Louis Becas, and one-twelfth to Don Galey
Filed Apr. 16, 1958, Ser. No. 728,804
8 Claims. (Cl. 226—110)

This invention relates to a method and means for dispensing trading stamps by merchants to their customers.

Trading stamps, the use of which has become quite extensive, are sold to merchants in pads of sheets from which the merchant or his assistant tears off stamps in numbers corresponding to the amount of the sale made. The time spent in connection with the dispensing of trading stamps is recognized as an item of expense in retail stores.

It is an object of the invention to provide a simple method of dispensing trading stamps and also to provide a machine for performing the method which greatly reduces the time and expense involved in the dispensing of trading stamps.

The method of dispensing trading stamps herein disclosed consists in forming the trading stamps in strips which are divided into sections spaced from the front to the rear ends of the strips. One of the strips has ten trading stamps in each section and in side by side relation so that by severing one section from the front end of the strip ten stamps may be obtained. The other strip has only one stamp in each section so that the severing of one section will result in the delivery of a single trading stamp. Ordinarily, each trading stamp has a nominal value indicating the purchase of a value of ten cents; therefore, the invention provides means for severing one or more sections selectively from the front ends of the strips so that stamps representing any amount or value of a sale may be readily severed from the ends of the strips. For example, should the amount of the sale be a multiple of dollars and dimes, similar multiple of sections of the first and second strips will be issued to the customer.

It is an object of the invention to provide a dispensing device wherein the first and second strips of stamps are employed in rolls which are supported adjacent a severing station, with sprocket means between the rolls and the severing station for moving the front ends of the strips into or through the severing stations in a selective manner so that selected numbers of sections of the first and second strips may be dispensed, there being means in the severing station employed in the separation of the issued sections of stamps from the ends of the strips.

It is a further object of the invention to provide manually operated means for selectively moving sections of the stamps to the severing station, and it is a further object of the invention to provide in connection therewith operator-controlled means for preventing operation of the dispensing device.

It is a further object of the invention to provide sprocket members for moving the strips of stamps so that sections on the front end thereof will be brought into the severing station, there being means for automatically stopping the sprockets so that the sections of stamps in the severing section will be properly positioned for severance along lines disposed between consecutive sections.

It is a further object of the invention to provide a stamp dispensing device having a simple and novel means for rotating and controlling the respective sprockets so that the trading stamps may be accurately and quickly dispensed.

Further objects and advantages of the invention may be brought out in the following part of the specification wherein details have been described for the purpose of making a complete disclosure of the invention without intending, however, to limit the scope of the invention which is defined by the appended claims.

Referring to the drawings which are for illustrative purposes only:

Figure 1:
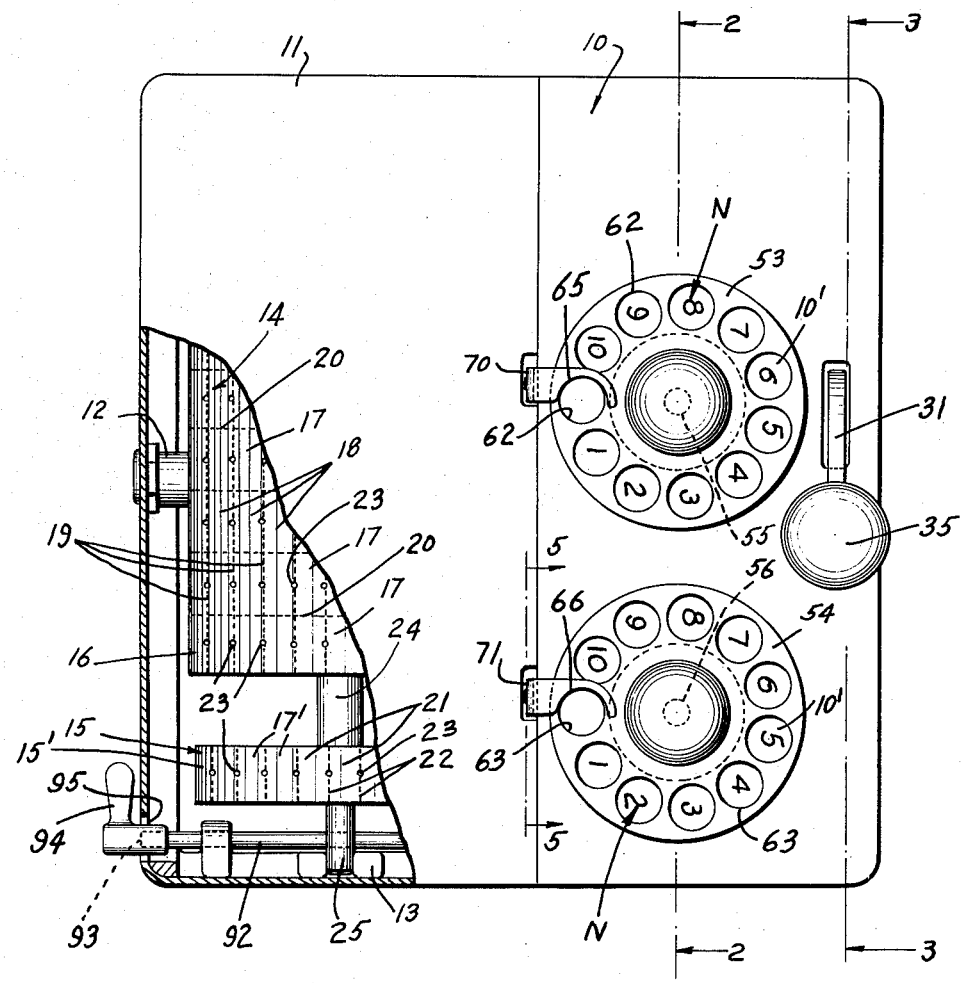
FIG. 1 is a partly sectioned plan view of a preferred form of the invention.

The trading stamp dispensing device includes a housing 10 including as the rear portion thereof a cover 11 adapted to be lifted off the remaining portion of the housing when a key actuated lock 12 is unlocked. Within the rearward portion of the housing 10, under the removable cover 11 there are supports 13 for first and second rolls 14 and 15 of trading stamps. The roll 14 comprises a strip of paper 16 on which trading stamps 17 are printed. The strip 16 is divided into sections 18 by transverse perforations 19. The strip 16 is ten stamps wide. That is to say, each section 18 includes ten trading stamps 17 disposed in side by side relation and being separated by longitudinal perforations 20. The second strip 15' from which the roll 15 is made is only one stamp wide. It is divided longitudinally into sections 21 by transverse perforations 22, and each section 21 consists of a single trading stamp 17'. On the transverse lines of division between longitudinally arranged trading stamps 17 and 17', sprocket tooth receiving openings 23 are punched in the strips of the stamps. The rolls 14 and 15 are supported on mandrels 24 and 25 which engage the supports 13.

Figure 4:
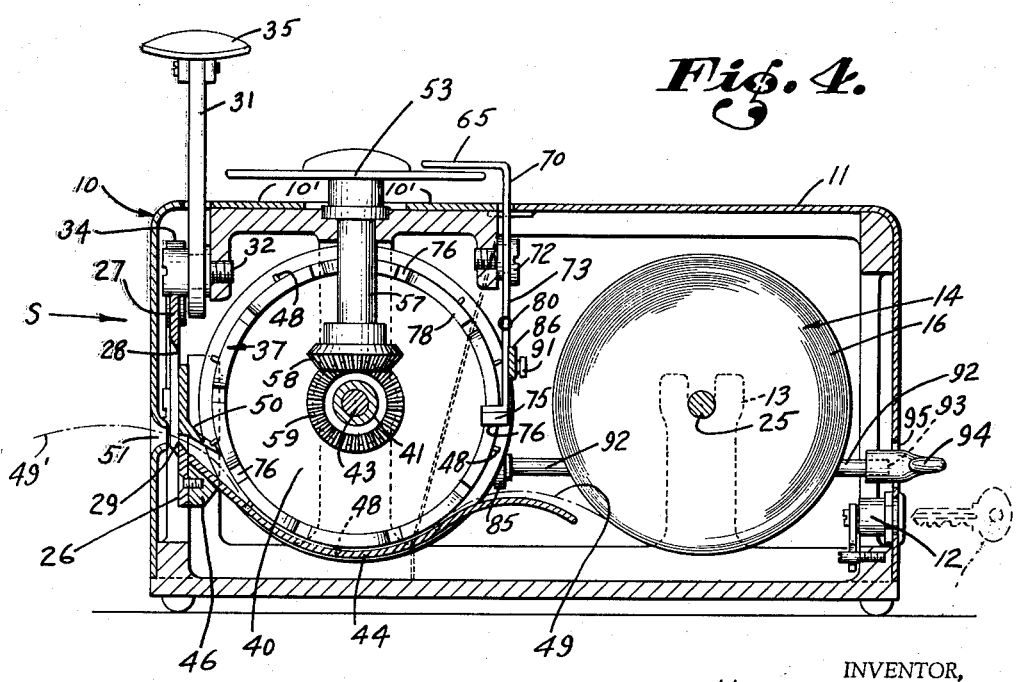
FIG. 4 is a cross sectional view taken as indicated by the line 4—4 of FIG. 3.
Figure 3:
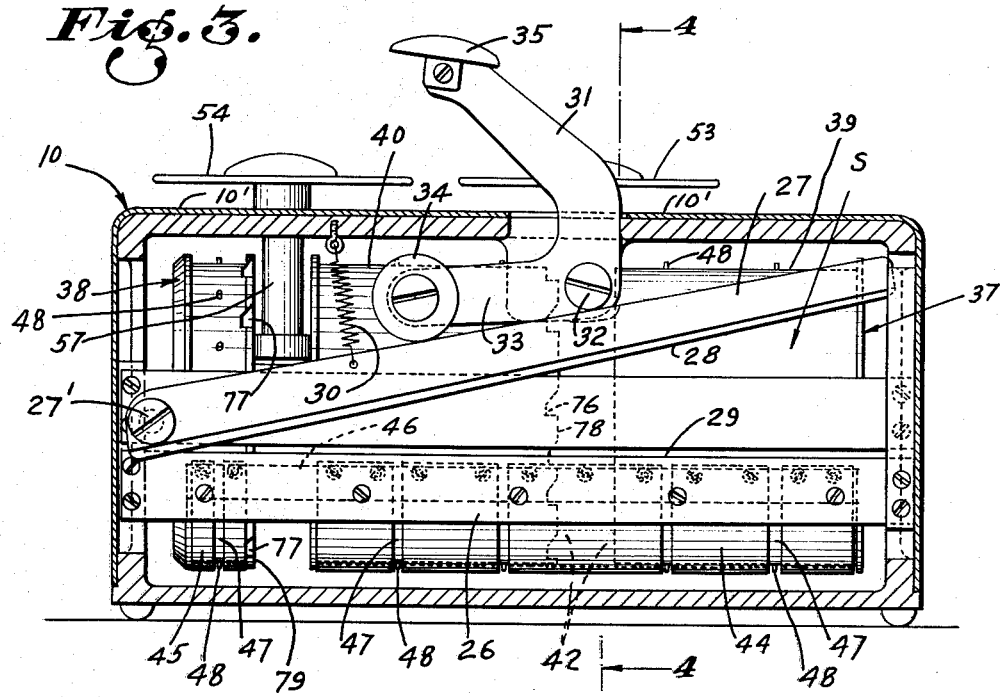
FIG. 3 is a sectional view taken as indicated by the line 3—3 of FIG. 1.

As shown in FIGS. 3 and 4 there is a stamp severing station S comprising stamp severing means consisting of a lower, stationary blade 26 arranged horizontally as shown and a movable blade 27 which is swingable on a pin 27', downwardly from the position in which it is shown in FIG. 3 to a position where its lower cutting edge 28 is below the upper, cutting edge 29 of the blade 26, thereby performing a shearing action similar to that of the blades of scissors. The blade 27 is normally held resiliently in raised position by a spring 30 and a manually operable lever 31 is provided for moving the blade 27 downwardly through its shearing stroke. The lever 31 is swingable on a pin 32. The lever 31 includes a laterally extending portion 33 supporting a roller 34 for engagement with the upper edge of the blade 27, so that when downward pressure is manually applied to a head 35 disposed on the upper end of the lever 31, the lever 31 will be rotated in counterclockwise direction, FIG. 3, and the roller 34 will force the blade 27 downwardly through its cutting stroke.

Figure 2:
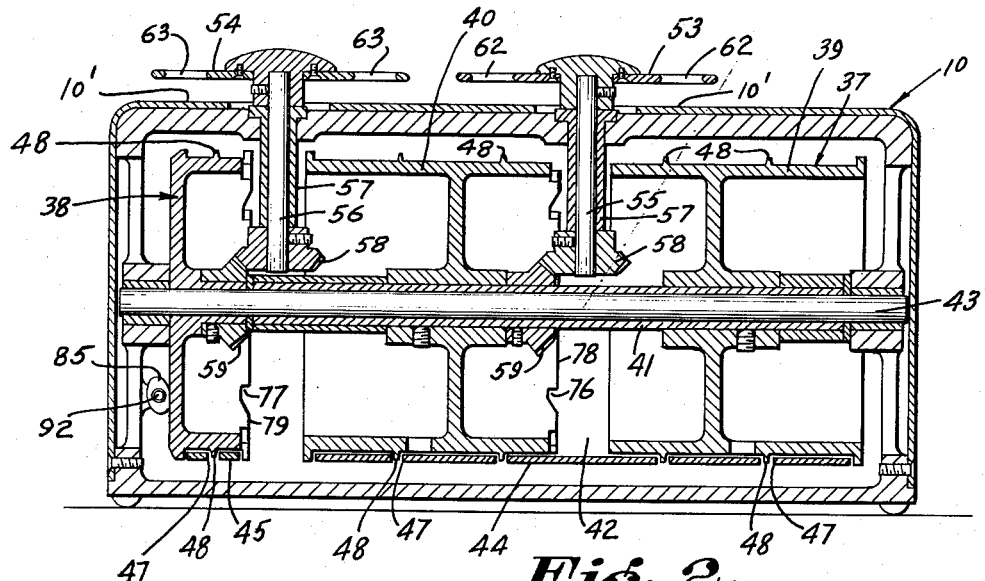
FIG. 2 is a sectional view taken as indicated by the line 2—2 of FIG. 1.

For feeding the trading stamps to the severing station S first and second sprockets 37 and 38 are provided, the first sprocket 37 having a width corresponding to the width of the strip 16. As shown in FIG. 2, the sprocket 37 consists of two sections 39 and 40 which are fixed on a sleeve 41 in spaced relation so as to provide an annular opening 42 centrally of the sprocket 37. The sprocket 37 rotates on a horizontal shaft 43 which is parallel to the mandrels 24 and 25 supporting the stamp rolls 14 and 15. The sprocket 38 has a width corresponding to one trading stamp, and is also rotatable on the shaft 42 in spaced relation to the outer end of the section 40 of the sprocket 37. Guide means for guiding the strips of stamps under the sprockets 37 and 38 consist of spring steel plates 44 and 45, secured at their forward ends to a longitudinal supporting strip 46 which forms part of the supporting structure, these guides 44 and 45 being shaped as shown in FIG. 4 so as to correspond to the curvature of the lower portions of the sprockets 37 and 38, and having slots 47 therein in which sprocket teeth 48 of the sprockets 37 and 38 may travel. The strips of stamps from the rolls 14 and 15 pass into the curved space between the sprockets and the guides 44 and 45 as indicated by phantom lines 49 in FIG. 4. The sprocket teeth 48 of the sprockets 37 and 38 engage the sprocket holes 23 of the stamp strips so that rotation of the sprockets 37 and 38 will move the strips so as to carry the front ends thereof out through the severing station S, between the cutting edges 28 and 29 of the blades 27 and 26, as indicated by the forward end 49' of the phantom line 49. A longitudinal stripper member 50, FIG. 4, is spaced upwardly from the supporting strip 46 for deflecting the strips outwardly between the cutting blades 26 and 27 and through a longitudinal exist opening 51 in the front wall of the housing 10.

For selectively rotating the sprockets, circular plates 53 and 54 are disposed on the top of the housing 10. These rotatable members 53 and 54 are mounted on the upper ends of shafts 55 and 56 supported by vertical sleeves 57. The shaft 55 extends down into the annular opening 42 of the sprocket 37 and has fixed on its lower end a driving gear 58 meshed with a driven gear 59 which is fixed on the sleeve 41 of the sprocket 37. The shaft 56 extends down into the space between the sprockets 37 and 38 and has on its lower end a driving gear 58 arranged to drive a driven gear 59 secured to the sprocket 38.

The rotatable members 53 and 54 have spaced shoulders adapted to be engaged by an instrumentality employed by the operator of the device, whereby the members 53 and 54 may be selectively rotated in clockwise direction, to selectively rotate the sprockets 37 and 38. The instrumentailty referred to in the foregoing is ordinarily a finger, and the rotatable members 53 and 54 are provided with spaced shoulders by the forming of openings 62 and 63 in circular arrangement around the centers of the members 53 and 54. Numerals N, from 1 to 10, are printed on the upper surface 55 of the housing 10 so as to be visible through the openings 62 and 63. Stops 65 and 66 are arranged above the peripheral portion of the rotatable members 53 and 54 and between the numerals 1 and 10, as shown in FIG. 1. If a finger is placed in an opening 62 or 63 above a numeral 1 and then moved clockwise into engagement with a stop 65 or 66, the corresponding rotatable member 53 or 54 will be rotated through a small arc and will effect a rotation of the corresponding sprocket 37 or 38 through an arc sufficient to feed one section 18 or 21 of the stamp strips across the stationary cutting edge 29. If the member 53 is rotated in the manner described in the foregoing, one section 18 consisting of ten trading stamps will be fed out through the severing means, and if the lever 31 is actuated, this section 18 will be sheared off and ten trading stamps will drop onto the table which supports the stamp dispensing device. The gears 58 and 59 are proportioned so that the arcs of rotation represented by the numerals N, 1 to 10, will effect feeding of corresponding numbers of trading stamp sections to the severing means. For example, if stamps representing a value of $3.70 are to be dispensed the operator will engage the opening 62 corresponding to the numeral 3 and will rotate the member 53 in clockwise direction until the finger engages the stop 65. This will feed three sections 18 of stamps out through the severing station S. The operator will then engage an opening 63 corresponding to a numeral 7 and will rotate the member 54 in clockwise direction into engagement with the stop 66, causing seven sections 21 of single trading stamps to be fed out through the severing station S. The actuation of the cutting blade 28 will then cut off the 37 stamps which project beyond the stationary cutting edge 29.

Figures 5, 6:
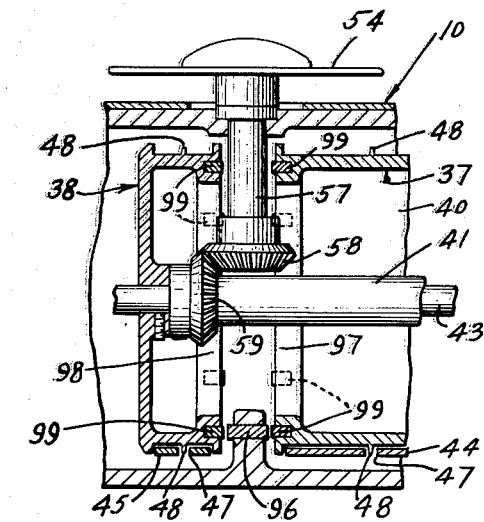
FIG. 5 is a fragmentary partly sectioned view taken as indicated by the line 5—5 of FIG. 1.
FIG. 6 is a fragmentary sectional view showing an alternative means for stopping the sprockets of the device.

The stops 65 and 66 are supported so as to have limited movement when engaged by the operator's finger. These stops 65 and 66 are mounted on the upper ends of substantially vertical levers 70 and 71 and are identical. The levers 70 and 71 are supported on horizontal pins 72, FIGS. 4 and 5, so that they may have a small swinging movement. The levers 70 and 71 have downward extensions 73 and 74 which are identical and have lugs or hooks 75 on the lower ends thereof adapted to be swung into engagement with notches 76 and 77 in the circular edges 78 and 79 of the sprocket parts 40 and 38. As shown in FIG. 5, tension springs 80 hold the levers 70 and 71 in retracted position. Whenever a stop 65 or 66 is engaged and moved by a finger during the operation of rotating the respective members 53 and 54, the latching dog or hook 75 associated therewith will be moved into engagement with a notch 76 or 77, thereby positively stopping the corresponding sprocket 37 or 38 in a position wherein the line of division between the projected trading stamps will be aligned with the stationary cutting edge 29, thereby preventing the sprockets 37 and 38 from coasting beyond their proper positions. For example, referring to FIG. 5, if the stop 56 is engaged by a leftwardly moving finger employed in rotating the disc 54, the lever 71 will be swung in counterclockwise direction around the pin 72 and the hook 75 will be swung into engagement with a notch 77 in the periphery of the sprocket 38. The finger will engage the stop 56 before the notch 77 reaches a position of alignment with the hook 75, so that the hook 75 will enter the notch 77 as it moves toward its final stopped position which occurs when the hook 75 enters the notch 77 to full extent.

The invention also provides means for preventing unauthorized operation of the trading stamp dispensing device, by locking the sprockets 37 and 38 so that they cannot be rotated. This locking means, in the form of the invention disclosed employs engagement of the hooks 75 with the notches 76 and 77. As best shown in FIG. 5, this locking means provides a fulcrum lever 83 adapted to be swung in clockwise rotation upon a pin 84 when an eccentric cam 85 is rotated in counterclockwise direction from the position in which it is shown in FIG. 5. A locking bar 86, connected to the upper end of the fulcrum lever 83 by a pivot pin 87, extends across the faces of the lever extensions 73 and 74. The locking bar 86 has shoulders 88 and 89 adapted to engage pins 90 and 91 which project respectively from the lever extensions 74 and 73, when the upper end of the fulcrum lever 83 is caused to swing rightwardly by counterclockwise rotation of the cam 85, these shoulders 88 and 89 moving the pins 90 and 91 rightwardly so as to effect rightward movement of the lever extensions 74 and 73 which will firmly seat the hooks 75 in the notches 76 and 77 of the sprockets 37 and 38.

The cam 85 is fixed on a horizontal shaft 92 which extends from the cam 85 to the back or operator's end of the housing 10. Means inaccessible to persons standing on the customer's side of the counter on which the dispensing device is placed are provided for rotation of the shaft so as to accomplish locking of the sprockets against unauthorized rotation. As shown in FIGS. 1 and 4, the shaft 92 has a rear end 93 adapted to receive a key 94, a portion of which extends through an opening 95 in the rear wall of the housing 10. If the operator leaves the vicinity of the stamp dispensing device he may operate the locking means and take the key 94 with him.

In FIG. 6, I show an alternative means for stopping the sprockets 37 and 38 in positions wherein the stamps fed through the severing device will be positioned with lines of divisions between consecutive stamp sections aligned with the stationary cutting edge 29. This stopping means consists of an Alnico permanent bar magnet 96 disposed between the confronting ends 97 and 98 of the sprockets 37 and 38, and iron slugs 99 mounted in the ends 97 and 98, spaced in a circle around the axis of rotation of the sprockets 37 and 38. When one of the sprockets 37 or 38 is rotated by the operating means hereinbefore described and nears the end of its arc of rotation, a slug 99 will enter the magnetic field of the magnet 96 which will then act to pull the slug into centralized relation to the magnet 96.

I claim:

1. In a stamp dispensing device having a housing, means to mount stamps in said housing, said stamps to be fed therefrom, a manually operable rotatable dial mounted on a shaft and provided with a plurality of circumferentially arranged finger holes, a feed drum for feeding said stamps, said drum being driven by said shaft of said dial for feeding said stamps, a finger lever pivotally supported on said housing and having an end thereof extending over the finger holes of said dial so as to be engaged by the operator's finger for reaching a predetermined point in the rotation of said dial, the improvement comprising: means on the other end of said lever to engage said drum to positively stop its rotation and to stop the feeding of said stamps while the operator's finger is in a finger hole in said dial and after the operator has rotated said dial a predetermined amount.

2. In a stamp dispensing device having a housing, means to mount stamps in said housing, said stamps to be fed therefrom, a manually operable rotatable dial mounted on a shaft and provided with a plurality of circumferentially arranged finger holes, a feed drum for feeding said stamps, said drum being driven by said shaft of said dial for feeding said stamps, a finger lever pivotally supported on said housing and having an end thereof extending over the finger holes of said dial so as to be engaged by the operator's finger for reaching a predetermined point in the rotation of said dial, the improvement comprising: means on the other end of said lever to engage shoulders on said drum to positively stop its rotation and to stop the feeding of said stamps while the operator's finger is in a finger hole in said dial and after the operator has rotated said dial a predetermined amount.

3. In a stamp dispensing device having a housing, means to mount stamps in said housing to be fed therefrom, a manually operable rotatable dial mounted on a shaft and provided with a plurality of circumferentially arranged finger holes, a feed drum for feeding said stamps, said drum being driven by said shaft of said dial for feeding said stamps, a finger lever having its body pivotally supported on said housing and having an end thereof at an angle to said body extending over the finger holes of said dial so as to be engaged by the operator's finger upon reaching a predetermined point in the rotation of said dial, the improvement comprising: lug means on the other end of said lever to engage shoulders on said drum while the operator's finger is in a finger hole in said dial and after the operator has rotated said dial a predetermined amount.

4. In a stamp dispensing device having a housing, a pair of stamp supporting means within said housing from which stamps may be fed, one of said stamp supporting means being adapted to support a single continuous width of stamps, and the other being adapted to support a plural unit width with continuous strip of stamps, a pair of spaced manually operable rotatable dials mounted on spaced shafts and each provided with a plurality of circumferentially arranged finger holes to constitute separate selector dials, a pair of spaced feed drums mounted on the same axis of rotation, one for feeding each strip, said drums being driven separately by said separate shafts of said separate dials for separately feeding said separate strips, a first finger lever pivotally supported on said housing and having an end thereof extending over the finger holes over one of said dials to be engaged by the operator's finger upon reaching a predetermined point in the rotation of said dial, a second finger lever pivotally supported on said housing and having an end thereof extending over the finger holes of the other of said dials so as to be engaged by the operator's finger upon reaching a predetermined point in the rotation of said dial, the improvement comprising: means on the other end of said first lever to engage one of said drums to positively stop its rotation and to stop the feeding of one of said strips of stamps while the operator's finger is in a finger hole in said one dial and after the operator has rotated said one dial a predetermined amount; and means on the other end of said second lever to engage the other of said drums to positively stop its rotation and to stop the feeding of the other of said strips of stamps while the operator's finger is in a finger hole in the other of said dials and after the operator has rotated said other dial a predetermined amount.

5. In a stamp dispensing device having a housing, a pair of stamp supporting means within said housing from which stamps may be fed, one of said stamp supporting means being adapted to support a single continuous width of stamps, and the other being adapted to support a plural unit width with a continuous strip of stamps, a pair of spaced manually operable rotatable dials mounted on spaced shafts and each provided with a plurality of circumferentially arranged finger holes to constitute separate selector dials, a pair of spaced feed drums mounted on the same axis of rotation, one for feeding each strip, said drums being driven separately by said separate shafts of said separate dials for separately feeding said separate strips, a first finger lever pivotally supported on said housing and having an end thereof extending over the finger holes over one of said dials to be engaged by the operator's finger upon reaching a predetermined point in the rotation of said dial, a second finger lever pivotally supported on said housing and having an end thereof extending over the finger holes of the other of said dials so as to be engaged by the operator's finger upon reaching a predetermined point in the rotation of said dial, the improvement comprising: means on the other end of said first lever to engage shoulders on one of said drums to positively stop its rotation and to stop the feeding of one of said strips of stamps while the operator's finger is in a finger hole in said one dial and after the operator has rotated said one dial a predetermined amount; and means on the other end of said second lever to engage shoulders on the other of said drums to positively stop its rotation and to stop the feeding of the other of said strips of stamps while the operator's finger is in a finger hole in the other of said dials and after the operator has rotated said other dial a predetermined amount.

6. The invention according to claim 1 including means to lock said means on the other end of said lever in engagement with said drum to positively prevent the rotation of said drum.

7. The invention according to claim 2 including means to lock said means on the other end of said lever in engagement with said shoulders to positively prevent the rotation of said drum.

8. The invention according to claim 4 including means to lock the other ends of said levers in engagement with said drum to positively prevent the rotation of said drum.

References Cited in the file of this patent

UNITED STATES PATENTS

| | | |
|---|---|---|
| 1,928,785 | Helsel | Oct. 3, 1933 |
| 2,021,038 | West | Nov. 12, 1935 |
| 2,097,788 | Furrer | Nov. 2, 1937 |
| 2,419,012 | Dodegge | Apr. 15, 1947 |
| 2,446,198 | Socke | Aug. 3, 1948 |
| 2,712,442 | Hanson | July 5, 1955 |
| 2,727,570 | Hempel | Dec. 20, 1955 |
| 2,789,818 | Ditzel | Apr. 23, 1957 |
| 2,962,282 | Bergland | Nov. 29, 1960 |